United States Patent [19]

Hsu

[11] 3,858,856

[45] Jan. 7, 1975

[54] EXTRUDER SCREW

[76] Inventor: John S. Hsu, 101 Ivy Ln., Somerville, N.J. 08876

[22] Filed: Jan. 26, 1973

[21] Appl. No.: 327,001

[52] U.S. Cl. ............................................. 259/191
[51] Int. Cl. ............................................. B01f 7/02
[58] Field of Search ........ 259/191, 192, 193, 9, 10, 259/25, 26, 45, 46, 97

[56] References Cited
UNITED STATES PATENTS

| | | | |
|---|---|---|---|
| 3,271,819 | 9/1966 | Lacher | 259/191 |
| 3,701,512 | 10/1972 | Schippers | 259/191 |
| 3,727,892 | 4/1973 | Notte | 259/191 |

*Primary Examiner*—Robert W. Jenkins
*Attorney, Agent, or Firm*—Olsen & Stephenson

[57] ABSTRACT

An extruder screw for plastic extruding apparatus which includes a solid transport section and a melt transport section. In the melt transport section, the screw is provided with a barrier flight which provides separation of unmelted plastic or solids in a solids feed channel spaced from melted plastic in a melt feed channel. The bases of the solids and melt feed channels in the melt transport section are tapered reversely to each other.

2 Claims, 2 Drawing Figures

PATENTED JAN 7 1975

3,858,856

EXTRUDER SCREW

BACKGROUND OF THE INVENTION

The present invention relates to extrusion apparatus for working plastic material and more particularly is directed to an improved extrusion screw structure.

Single screw extrusion includes the steps of feeding the plastic or polymeric material in pellet, chip, powder or flake form to a feed section of the screw. The screw is mounted in a heated barrel with the screw flight (which is in the form of a thread) wiping the barrel surface as the screw rotates. The cold polymer tends to stick to the hot barrel so that as the flight wipes by it tends to force the mass of polymeric material to the rear of the channel in the screw. This force or drag in the polymer packs it into the rear of the channel creating a tightly packed, solid bed of unmelted resin. At the same time, the thin film of melted plastic or polymeric material adhering to the inner surface of the heated barrel is not built up sufficiently for scraping by the flight until additional melting occurs. After build-up of the thin film of melted plastic on the inner surface of the heated barrel, the flight starts to scrape the melt from the barrel whereupon it is forced to flow radially inwardly toward the screw root. This action creates a circular flow in the melt pool that remains present for the entire length of the screw.

As the screw channel depth decreases in the transition section, the solid bed of polymer is forced radially outwardly into the barrel surface. As this occurs, shear in the melt film caused by the screw rotation creates heat in the film which melts off the surface of the solid bed at the interface of the solid bed and the melt film. The melt created by this action tends to adhere to the barrel and the screw flight wipes off this melt and forces it into the melt pool. The solid bed continues down the channel because of the dragging action of the shear forces in the melt film. However, the solid bed becomes thinner until it reaches the metering section in which the channel depth is constant.

From the above description of the melting mechanism, various phenomena occur. Firstly, if the rate of decrease of the solid bed thickness as a result of melting is less than the rate of decrease of channel depth, an unstable condition can arise and the bed can be forced to become wider or be squeezed flat. This condition can entirely or at least partially choke off the channel and thereby create a blockage for flow of melt down the channel. This is known as a surge condition.

Secondly, pieces of the solid bed of polymer may break and mix with the melt. This creates a non-homogeneous melt.

Thirdly, as soon as the solid bed enters the metering section from a channel of gradually decreasing depth to a channel of constant depth, the force which pushes the solid bed of polymer onto the barrel is no longer present. This is an unstable condition and the shear action on the bed causes the latter to fold over and break up. The unmelted portion can thus mix with the melt. In fact, this is the major cause for such unmelted pieces being mixed into the melt and again creating a non-homogeneous melt.

The presence of unmelted pieces in the melt is undesirable because the pieces are in the low shear melt pool and are well insulated from the barrel heat. This causes a very slow completion of melting of the unmelted pieces of the solid bed.

By the present invention it is proposed to provided an extruder screw which is constructed and arranged so as to prevent break up of the solid bed of polymer by maintaining the solid bed as a single, solid mass and by not permitting any pieces of any part of the solid bed to escape into the melt pool. Moreover, the width of the bed at the melt interface of the barrel is maintained constant while only the depth of the channel is varied to match the melting rate.

SUMMARY OF THE INVENTION

The above is accomplished by providing an extruder screw structure which comprises, generally, a solid feed section of substantially constant root diameter for a length thereof, a melt transport section defined by a main flight of substantially the same lead as the flight of the solid feed section and a barrier or secondary flight of lesser diameter than the main flight and being constantly, lengthwise spaced therefrom to define a melt channel and a solids carrying channel; and a transition section which merges with a metering section. The base of the melt channel tapers from a maximum to a minimum diameter from one end of the melt transport section while the diameter of the bases of the solids carrying channel is tapered in the opposite direction,

BRIEF DESCRIPTION OF THE DRAWINGS

The above advantageous features and structures of the present invention will be even more readily understood and appreciated by referring to the following detailed description thereof in conjunction with the accompanying drawing in which.

DETAILED DESCRIPTION OF THE INVENTION

Figure 1:
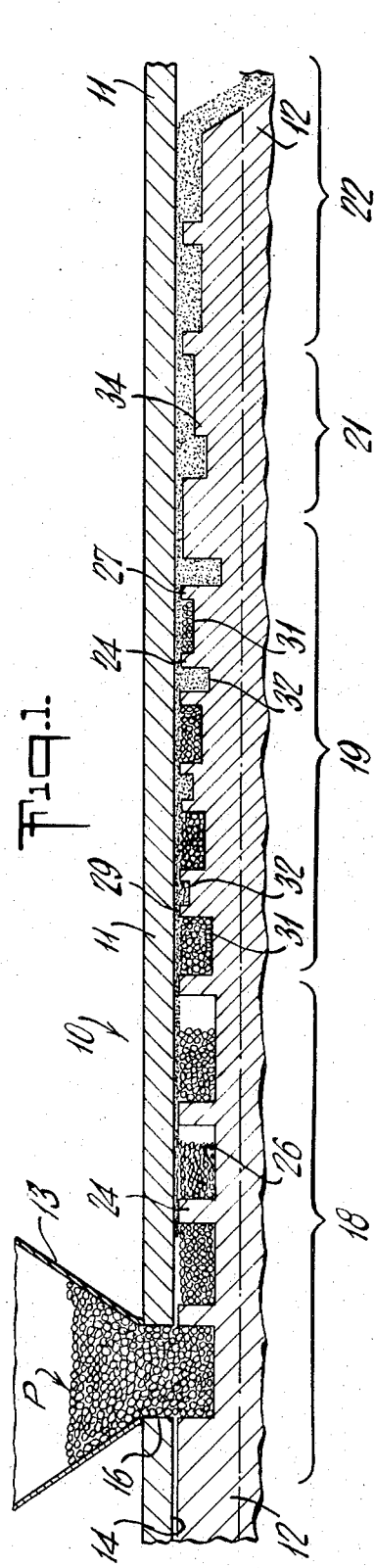
FIG. 1 is a schematic and fragmentary cross-sectional view taken through the center of a barrel of an extruder apparatus with an extruder screw embodying the structures of the present invention.

Referring now to the drawings, there is shown an extruder screw assembly 10 comprising generally a barrel subassembly 11 and an extruder screw or rotor 12. The extruder screw assembly 10 can also include a standard drive transmission and thrust subassembly, an extrudate slicer, a scavenging extruder and a cooling and heating system which do not form part of the present invention and accordingly are not shown.

The barrel subassembly 11 includes a feed hopper 13 from which the solid polymers P in the form of chips, pellets, powder or flakes is fed into the bore 14 through an opening 16 in the barrel 11. The polymer of plastic P may be continuously fed from the hopper 13 to the screw 12.

The screw or rotor 12 is rotatably mounted within the barrel 11 and includes, generally, a solids transport section 18 adjacent the feed hopper, and a melt transport section 19, a transition section 21, and a metering section 22.

Figure 2:
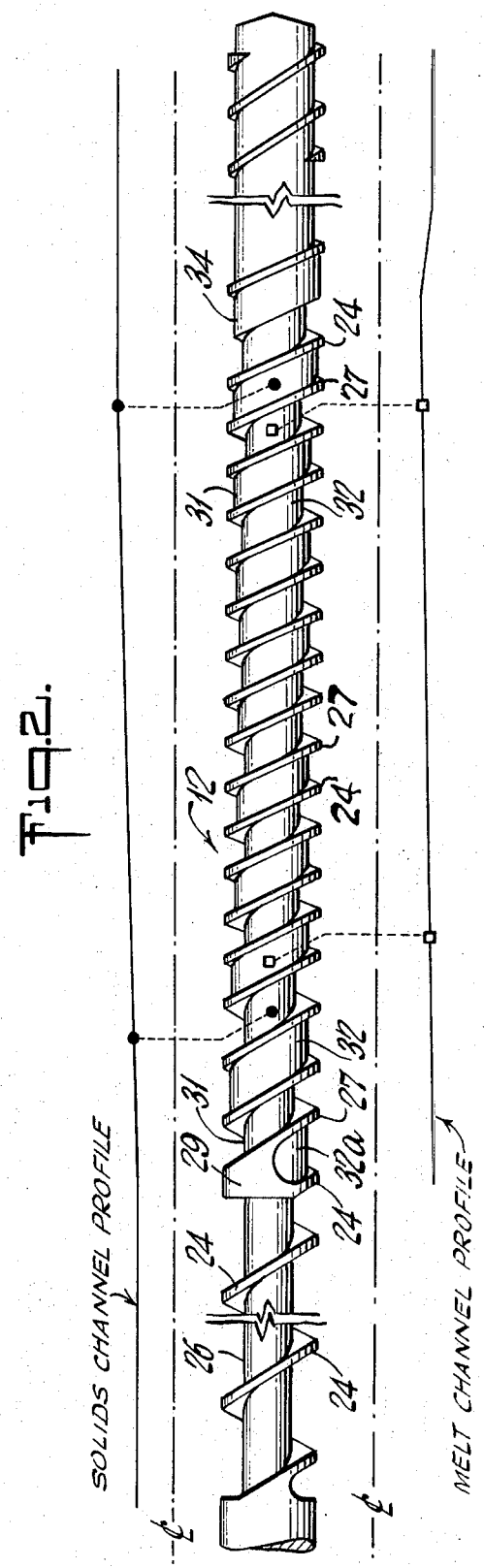
FIG. 2 is a fragmentary, longitudinal, plan view of the extruder screw of the present invention with the oppositely tapered solids channel and melt channel root profiles illustrated by the lines identified by a solid dot and a small square respectively.

As shown in FIG. 2, the solids transport section 18 includes a shaft section of a substantially constant root diameter and a projecting helical feed thread or main flight 24. The main flight 24 has a substantially constant lead along the length of the solids feed section 18. The helical screw defines the solids feed channel 26 in which the polymer P is carried forwardly in the barrel 11.

The main flight 24 is undercut adjacent the right end of the solids feed section 18, as viewed in FIG. 2, to form a barrier flight 27 of which the edge is spaced a greater distance from the surface of the barrel bore 14 to thereby provide increased clearance from the melted polymer. The barrier flight 27 initiated in the melt transport section 19 can be seen as a continuation of the main flight 24 in the solids transport section 18, while the main flight 24 in the melt transport section 19 is initiated at a point displaced from the end of the main flight 24 in the solids transport section 18. This is accomplished by the barrier flight 27 being formed along the leading edge of a projection 29 of greater thickness than the remainder of the main flight 24. The main flight 24, however, is continued along the trailing edge of the projection 29 and is thereby in lengthwise spaced relationship with the barrier flight 27 to define therebetween in the melt transport section 19, a solids feed channel 31 and a melt feed channel 32. The base of the solids feed channel 31 is of varying, tapering root diameter, being a minimum adjacent the solids transport section 18 and increasing to a maximum adjacent the transition section 21. This tapering root profile of the solids feed channel 31 is illustrated schematically by the uppermost line identified by solid dots in FIG. 2.

The main flight 24 of the melt transport section 19 is of substantially the same lead or pitch as in the solids transport section 18 and is also constantly spaced from the barrier flight 27. In this manner, the width of the solids feed channel 31 is maintained substantially constant for the entire length of the melt feed section 19.

The base of the melt channel 32 along the length of the melt transport section 19 is also of varying tapered root diameter but is tapered in the opposite direction from the taper of the base of the solids feed channel 31. The base of the melt channel 32 increases from a maximum diameter at the projection 29 to a minimum diameter at the transition section 21 which provides a melt channel root profile illustrated schematically by the lowermost line identified by small squares in FIG. 2.

Again to be noted is that the melt channel 32 is initiated by a gradually tapering groove 32A formed in the projection 29. The melt channel 32 can also be of substantially constant width along the length of the melt section 19.

The transitional section 21 reverses the taper of the melt channel 31, as shown in FIG. 2, and provides a shallower melt channel 34 which is of greater width than the preceding melt channel 31. The width of the melt channel 31 is increased by eliminating the barrier flight 27 in the transitional section 21 as shown in FIG. 2. Thereafter the screw 12 is formed with a metering section 22 of substantially conventional structure such as, for example, the metering section disclosed in U.S. Pat. No. 3,375,549 issued Apr. 2, 1968.

The extrusion operation is initiated by setting the screw 12 in rotation within the barrel 11 which is heated electrically to a temperature capable of generating the heat required to melt the particular polymer to be extruded. The continuous flow of polymer P in chip, pellet, powder or flake form is introduced into the solids feed section 18 of the screw 12 from the the hopper 16. The polymer P is picked up by the feed thread or main flight 24 of the solids feed section and is forced forwardly within the barrel 11 in the continuous channel or groove 26 which is of a substantially constant lead. The heated barrel 11 causes a thin film of melted polymer to be deposited on the inner surface of the barrel. The thin film of melted polymer is not at this point sufficiently thick for pick up by the main flight 24. As the solid bed of polymer P progresses in the channel 26, the thin film of melted polymer creates a drag on the solid polymer whereby the latter is gently packed in the rear of the channel 26 as schematically represented in FIG. 1. When sufficient melting of the polymer has occurred, as when the bed of solid polymer approaches the position of the projection 29, the thickness of the film of molten polymer on the inner surface of the barrel 11 is such that the leading edge of the main flight 24 scrapes some of the film off the inner surface of the barrel 17 and deposits the molten polymer in the melt channel 32 where it is maintained separate from the solids bed channel 31 which contains the solid polymer P by the barrier flight 27. Here, also, it is emphasized that the barrier flight clearance is such that no polymeric solids are permitted to enter the melt pool in the melt channel 32.

It is also again emphasized that the solids feed channel 32 is of substantially constant width along the length of the melt transport section 19 and is gradually diminishing in depth. Thus a constant maximum width of solid polymer is maintained in contact with the thin film of melted polymer on the inner surface of the barrel 11 which provides for very high melting rates because the solids are constntly maintained exposed to larger areas of high shear, high head melt-solids interface than has been possible with prior art extruder screw apparatus. Furthermore, as the solids feed channel 32 is of constant width, the bed of solid polymer is not forced or squeezed into a tightly packed narrower mass thereby eliminating the major cause of surging in prior art extruder apparatus.

It is further noted that the melted polymer is accepted in the melt channel 32 which is of increasing depth as it approaches the transitional section 21. In view of the ever-deepening melt channel 32 for accommodating the entire volume of the melt as the polymer is melted, lower melt temperature are obtained than heretofore with prior art devices since, once the polymer is melted, it passes into the much deeper melt channel where it is subjected to less shear as it is fed forwardly to an extrusion die, melt pipe, accumulator or other such device.

Particularly advantageous in the extruder screw structure of the present invention is the fact that since the solids and melt feed channels are separated, the effective melting rate of any given polymer is only a function of polymer properties barrel temperature, screw diameter and screw feed thereby providing an extruder screw of more universal application than has heretofore been available. Another particular advantage of the structure of the melt transport section above described is the resulting lower energy input required per pound of polymer to be extruded thus permitting the lowest possible melt temperature for any given polymer. Provision of additional energy to produce higher melt temperatures, if desired, is much more readily accomplished than the removal of energy to produce lower melt temperatures.

After the melt has been completed in the melt transport section 19 described in considerable detail above, the barrier flight 27 is eliminated in the transitional section 21 to form a single melt channel 34 which transports the completely melted polymer forwardly to the metering section 22 from which it is dispersed into an extrusion die, melt pipe, accumulator or other such device in the conventional manner.

While I have described the extruder screw of the present invention in detail, particularly with reference to the structure of the melt transport section 19, it will be readily apparent to those skilled in the art that various changes, alterations and modifications can be made in the structure thereof without departing from the spirit and scope of the invention as defined in the following claims.

What is claimed is:

1. An extruder screw adapated to be mounted in the barrel of an extruder apparatus, said screw comprising a solids transport section along an end length of said screw and a melt transport section along an intermediate length of said screw, said solids transport section including a helical thread defining a main flight of a predetermined constant lead to form a solids feed channel, said melt transport section having a helical thread defining a main flight of substantially the same lead as said main flight of said solids transport section, and a second helical thread defining a barrier flight lengthwise spaced from said main flight to form a melt channel separate from said solids feeds channel, said main flight in said melt transport section being initiated at a point displaced from the end of the main flight in said solids transport section, and said barrier flight being a continuation of said main flight in said solids transport section, said melt channel having a root diameter tapering downwardly from the end of said solids transport section, and said solids feed channel having a root diameter tapering reversely from the root diameter taper of said melt channel.

2. The invention as defined in claim 1 wherein said barrier flight is of lesser diameter than said main flight.

* * * * *